(12) United States Patent
Liptsey-Rahe (10) Patent No.: US 10,559,044 B2
(45) Date of Patent: Feb. 11, 2020

(54) IDENTIFICATION OF PEAK DAYS

(71) Applicant: OPOWER, INC., Arlington, VA (US)

(72) Inventor: Alexandra Liptsey-Rahe, San Francisco, CA (US)

(73) Assignee: OPower, Inc., Redwood Shores, CA (US)

( * ) Notice: Subject to any disclaimer, the term of this patent is extended or adjusted under 35 U.S.C. 154(b) by 479 days.

(21) Appl. No.: 14/947,664

(22) Filed: Nov. 20, 2015

(65) Prior Publication Data

US 2017/0148114 A1    May 25, 2017

(51) Int. Cl.
*G06Q 50/06* (2012.01)
*G06Q 10/06* (2012.01)
*G06Q 30/02* (2012.01)

(52) U.S. Cl.
CPC .......... *G06Q 50/06* (2013.01); *G06Q 10/067* (2013.01); *G06Q 10/06315* (2013.01); *G06Q 30/0204* (2013.01)

(58) Field of Classification Search
CPC ............. G06Q 50/06; G06Q 10/06315; G06Q 30/0204; G06Q 10/067; G06Q 10/06; H04Q 1/00; Y04S 20/32
See application file for complete search history.

(56) References Cited

U.S. PATENT DOCUMENTS

| | | | |
|---|---|---|---|
| 4,334,275 A | 6/1982 | Levine | |
| 4,843,575 A | 6/1989 | Crane | |
| 5,513,519 A | 5/1996 | Cauger et al. | |
| 5,566,084 A | 10/1996 | Cmar | |
| 5,717,609 A | 2/1998 | Packa et al. | |
| 5,855,011 A | 12/1998 | Tatsuoka | |

(Continued)

FOREIGN PATENT DOCUMENTS

| AU | 2010315015 | 7/2014 |
|---|---|---|
| CA | 2779754 | 5/2011 |

(Continued)

OTHER PUBLICATIONS

International Search Report and Written Opinion for PCT Application No. PCT/US2015/038692, dated Sep. 24, 2015, 13 pages.

(Continued)

*Primary Examiner* — Matthew S Gart
*Assistant Examiner* — Stephen S Swartz
(74) *Attorney, Agent, or Firm* — Kraguljac Law Group, LLC (57) ABSTRACT

The subject disclosure relates to systems and methods for calculating a peak consumption threshold, and for using the peak consumption threshold to determine the likelihood of future peak resource consumption events. In some aspects, methods of the subject technology include steps for receiving resource consumption data for a plurality of utility customers, wherein the resource consumption data comprises an indication of an amount of electric power used by each of the plurality of utility customers, and calculating, using the one or more processors, a plurality of consumption averages for the resource consumption data. In some aspects, the method can further include steps for calculating a peak consumption threshold based on the consumption values for the resource consumption data.

18 Claims, 6 Drawing Sheets

(56) References Cited

U.S. PATENT DOCUMENTS

| | | |
|---|---|---|
| 5,873,251 A | 2/1999 | Iino |
| 5,930,773 A | 7/1999 | Crooks et al. |
| 5,930,803 A | 7/1999 | Becker et al. |
| 5,948,303 A | 9/1999 | Larson |
| 6,035,285 A | 3/2000 | Schlect et al. |
| 6,088,688 A | 7/2000 | Crooks et al. |
| 6,295,504 B1 | 9/2001 | Ye et al. |
| 6,327,605 B2 | 12/2001 | Arakawa et al. |
| D462,077 S | 8/2002 | Greminger |
| 6,606,104 B1 | 8/2003 | Kondo et al. |
| 6,701,298 B1 | 3/2004 | Jutsen |
| 6,732,055 B2 | 5/2004 | Bagepalli et al. |
| 6,778,945 B2 | 8/2004 | Chassin et al. |
| 6,785,620 B2 | 8/2004 | Kishlock et al. |
| 6,972,660 B1 | 12/2005 | Montgomery, Jr. et al. |
| 7,020,508 B2 | 3/2006 | Stivoric et al. |
| 7,073,073 B1 | 7/2006 | Nonaka et al. |
| 7,073,075 B2 | 7/2006 | Freyman et al. |
| 7,136,710 B1 | 11/2006 | Hoffberg et al. |
| 7,142,949 B2 | 11/2006 | Brewster et al. |
| 7,149,727 B1 * | 12/2006 | Nicholls ............... G01D 4/004 |
| | | 705/412 |
| 7,200,468 B2 | 4/2007 | Ruhnke et al. |
| 7,243,044 B2 | 7/2007 | McCalla |
| 7,333,880 B2 | 2/2008 | Brewster et al. |
| 7,356,548 B1 | 4/2008 | Culp et al. |
| 7,444,251 B2 | 10/2008 | Nikovski et al. |
| 7,460,502 B2 | 12/2008 | Arima et al. |
| 7,460,899 B2 | 12/2008 | Almen |
| 7,552,030 B2 | 6/2009 | Guralnik et al. |
| 7,561,977 B2 | 7/2009 | Horst et al. |
| D605,652 S | 12/2009 | Plaisted et al. |
| 7,878,890 B2 | 2/2011 | Toyohara et al. |
| 7,991,513 B2 | 8/2011 | Pitt |
| 8,065,098 B2 | 11/2011 | Gautam |
| 8,166,047 B1 | 4/2012 | Cohen et al. |
| D660,867 S | 5/2012 | Marchetti |
| 8,180,591 B2 | 5/2012 | Yuen et al. |
| D665,411 S | 8/2012 | Rai et al. |
| 8,239,178 B2 | 8/2012 | Gray et al. |
| D667,841 S | 9/2012 | Rai et al. |
| 8,260,468 B2 | 9/2012 | Ippolito et al. |
| 8,275,635 B2 | 9/2012 | Stivoric et al. |
| 8,280,536 B1 | 10/2012 | Fadell et al. |
| D671,550 S | 11/2012 | Chen et al. |
| 8,348,840 B2 | 1/2013 | Heit et al. |
| 8,375,118 B2 | 2/2013 | Hao et al. |
| 8,417,061 B2 | 4/2013 | Kennedy et al. |
| 8,428,785 B2 | 4/2013 | Boucher et al. |
| 8,429,630 B2 | 4/2013 | Nickolov et al. |
| 8,478,447 B2 | 7/2013 | Fadell et al. |
| 8,489,245 B2 | 7/2013 | Carrel et al. |
| D687,445 S | 8/2013 | Fuhrmann |
| D694,252 S | 11/2013 | Helm |
| 8,583,288 B1 | 11/2013 | Rossi et al. |
| D697,526 S | 1/2014 | Bruck et al. |
| 8,630,741 B1 | 1/2014 | Matsuoka et al. |
| 8,660,813 B2 | 2/2014 | Curtis et al. |
| D703,690 S | 4/2014 | MacCubbin et al. |
| 8,690,751 B2 | 4/2014 | Auphan |
| D707,245 S | 6/2014 | Bruck et al. |
| 8,751,432 B2 | 6/2014 | Berg-Sonne et al. |
| D710,871 S | 8/2014 | McCormack et al. |
| 8,805,000 B2 | 8/2014 | Derby et al. |
| 8,818,758 B1 | 8/2014 | Singh et al. |
| D714,335 S | 9/2014 | Cojuangco et al. |
| 8,868,248 B2 | 10/2014 | Park |
| D717,328 S | 11/2014 | Lin |
| D720,767 S | 1/2015 | Miller et al. |
| 8,954,849 B2 | 2/2015 | Doi et al. |
| D725,133 S | 3/2015 | Smirin et al. |
| D725,664 S | 3/2015 | Nies et al. |
| D729,268 S | 5/2015 | Nies et al. |
| D730,386 S | 5/2015 | Ryan et al. |
| 9,031,703 B2 | 5/2015 | Nakamura et al. |
| D731,538 S | 6/2015 | Lee |
| D732,049 S | 6/2015 | Amin |
| D732,062 S | 6/2015 | Kwon |
| D740,847 S | 10/2015 | Yampolskiy et al. |
| 2001/0047290 A1 | 11/2001 | Petras et al. |
| 2002/0065581 A1 | 5/2002 | Fasca |
| 2002/0178047 A1 | 11/2002 | Or et al. |
| 2002/0198629 A1 | 12/2002 | Ellis |
| 2003/0011486 A1 | 1/2003 | Ying |
| 2003/0018517 A1 | 1/2003 | Dull et al. |
| 2003/0023467 A1 | 1/2003 | Moldovan |
| 2003/0216971 A1 | 11/2003 | Sick et al. |
| 2004/0024717 A1 | 2/2004 | Sneeringer |
| 2004/0111410 A1 | 6/2004 | Burgoon et al. |
| 2004/0140908 A1 | 7/2004 | Gladwin et al. |
| 2005/0257540 A1 | 11/2005 | Choi et al. |
| 2006/0089851 A1 | 4/2006 | Silby et al. |
| 2006/0093222 A1 | 5/2006 | Saffer et al. |
| 2006/0103549 A1 | 5/2006 | Hunt et al. |
| 2006/0195438 A1 | 8/2006 | Galuten |
| 2006/0246968 A1 | 11/2006 | Dyke-Wells |
| 2007/0061735 A1 | 3/2007 | Hoffberg et al. |
| 2007/0185835 A1 | 8/2007 | Ursitti et al. |
| 2007/0198459 A1 | 8/2007 | Boone et al. |
| 2007/0203860 A1 | 8/2007 | Golden et al. |
| 2007/0213992 A1 | 9/2007 | Anderson et al. |
| 2007/0255457 A1 | 11/2007 | Whitcomb et al. |
| 2007/0260405 A1 | 11/2007 | McConnell et al. |
| 2008/0027885 A1 | 1/2008 | van Putten et al. |
| 2008/0033587 A1 | 2/2008 | Kurita et al. |
| 2008/0167535 A1 | 7/2008 | Stivoric et al. |
| 2008/0172312 A1 * | 7/2008 | Synesiou ............... G06Q 10/00 |
| | | 705/34 |
| 2008/0177678 A1 * | 7/2008 | Di Martini ............ G01D 4/002 |
| | | 705/412 |
| 2008/0189632 A1 | 8/2008 | Tien et al. |
| 2008/0195561 A1 | 8/2008 | Herzig |
| 2008/0222561 A1 | 9/2008 | Helfman et al. |
| 2008/0244429 A1 | 10/2008 | Stading |
| 2008/0281473 A1 | 11/2008 | Pitt |
| 2008/0281763 A1 | 11/2008 | Yliniemi |
| 2008/0304112 A1 | 12/2008 | Matsuno |
| 2008/0306985 A1 | 12/2008 | Murray et al. |
| 2009/0106202 A1 | 4/2009 | Mizrahi |
| 2009/0106674 A1 | 4/2009 | Bray et al. |
| 2009/0204267 A1 | 8/2009 | Sustaeta et al. |
| 2009/0217175 A1 | 8/2009 | Bechtel et al. |
| 2009/0217179 A1 | 8/2009 | Mons et al. |
| 2009/0240381 A1 * | 9/2009 | Lane ..................... H02J 3/14 |
| | | 700/296 |
| 2009/0326726 A1 | 12/2009 | Ippolito et al. |
| 2010/0025483 A1 | 2/2010 | Hoeynck et al. |
| 2010/0076835 A1 * | 3/2010 | Silverman ............. G06Q 10/06 |
| | | 705/14.33 |
| 2010/0082174 A1 | 4/2010 | Weaver |
| 2010/0099954 A1 | 4/2010 | Dickinson et al. |
| 2010/0106575 A1 | 4/2010 | Bixby et al. |
| 2010/0138363 A1 | 6/2010 | Batterberry et al. |
| 2010/0156665 A1 | 6/2010 | Krzyzanowski et al. |
| 2010/0179704 A1 | 7/2010 | Ozog |
| 2010/0180223 A1 | 7/2010 | Speier |
| 2010/0198713 A1 | 8/2010 | Forbes, Jr. et al. |
| 2010/0217452 A1 | 8/2010 | McCord et al. |
| 2010/0217549 A1 | 8/2010 | Galvin et al. |
| 2010/0217550 A1 | 8/2010 | Crabtree et al. |
| 2010/0217642 A1 | 8/2010 | Crubtree et al. |
| 2010/0217651 A1 * | 8/2010 | Crabtree ............... G06Q 10/00 |
| | | 705/7.22 |
| 2010/0232671 A1 | 9/2010 | Dam et al. |
| 2010/0241648 A1 | 9/2010 | Ito et al. |
| 2010/0286937 A1 | 11/2010 | Hedley et al. |
| 2010/0289643 A1 | 11/2010 | Trundle et al. |
| 2010/0324962 A1 | 12/2010 | Nesler et al. |
| 2010/0332373 A1 | 12/2010 | Crabtree et al. |
| 2011/0022242 A1 * | 1/2011 | Bukhin ................. G06Q 10/06 |
| | | 700/291 |
| 2011/0022429 A1 | 1/2011 | Yates et al. |
| 2011/0023045 A1 | 1/2011 | Yates et al. |
| 2011/0040666 A1 | 2/2011 | Crabtree et al. |

(56) References Cited

U.S. PATENT DOCUMENTS

| | | | |
|---|---|---|---|
| 2011/0061014 A1 | 3/2011 | Frader-Thompson et al. | |
| 2011/0063126 A1 | 3/2011 | Kennedy et al. | |
| 2011/0106316 A1 | 5/2011 | Drew et al. | |
| 2011/0106328 A1 | 5/2011 | Zhou et al. | |
| 2011/0106471 A1 | 5/2011 | Curtis et al. | |
| 2011/0153102 A1 | 6/2011 | Tyagi et al. | |
| 2011/0178842 A1 | 7/2011 | Rane et al. | |
| 2011/0178937 A1 | 7/2011 | Bowman | |
| 2011/0205245 A1 | 8/2011 | Kennedy et al. | |
| 2011/0231320 A1 | 9/2011 | Irving | |
| 2011/0251730 A1 | 10/2011 | Pitt | |
| 2011/0251807 A1 | 10/2011 | Rada et al. | |
| 2011/0282505 A1 | 11/2011 | Tomita et al. | |
| 2011/0288905 A1* | 11/2011 | Mrakas | G06Q 10/06 705/7.25 |
| 2011/0313964 A1 | 12/2011 | Sanchey Loureda et al. | |
| 2012/0036250 A1 | 2/2012 | Vaswani et al. | |
| 2012/0053740 A1 | 3/2012 | Venkatakrishnan et al. | |
| 2012/0066168 A1 | 3/2012 | Fadell et al. | |
| 2012/0078417 A1 | 3/2012 | Connell, II et al. | |
| 2012/0084063 A1 | 4/2012 | Drees et al. | |
| 2012/0179692 A1 | 7/2012 | Hsiao et al. | |
| 2012/0215369 A1 | 8/2012 | Desai et al. | |
| 2012/0216123 A1 | 8/2012 | Shklovskii et al. | |
| 2012/0259678 A1 | 10/2012 | Overturf et al. | |
| 2012/0290230 A1 | 11/2012 | Berges Gonzalez et al. | |
| 2012/0310708 A1 | 12/2012 | Curtis et al. | |
| 2013/0030595 A1* | 1/2013 | Chow | H02J 3/14 700/297 |
| 2013/0060531 A1 | 3/2013 | Burke et al. | |
| 2013/0060720 A1 | 3/2013 | Burke | |
| 2013/0073450 A1* | 3/2013 | Swan | G06Q 40/00 705/39 |
| 2013/0097177 A1 | 4/2013 | Fan et al. | |
| 2013/0097481 A1 | 4/2013 | Kotler et al. | |
| 2013/0173064 A1 | 7/2013 | Fadell et al. | |
| 2013/0253709 A1 | 9/2013 | Renggli et al. | |
| 2013/0261799 A1 | 10/2013 | Kuhlmann et al. | |
| 2013/0262040 A1 | 10/2013 | Buckley | |
| 2014/0006314 A1 | 1/2014 | Yu et al. | |
| 2014/0018969 A1* | 1/2014 | Forbes, Jr. | H02J 3/32 700/295 |
| 2014/0019319 A1 | 1/2014 | Derby et al. | |
| 2014/0074300 A1 | 3/2014 | Shilts et al. | |
| 2014/0107850 A1 | 4/2014 | Curtis | |
| 2014/0148706 A1 | 5/2014 | Van Treeck et al. | |
| 2014/0163746 A1 | 6/2014 | Drew et al. | |
| 2014/0207292 A1 | 7/2014 | Ramagem et al. | |
| 2014/0297206 A1* | 10/2014 | Silverman | G01R 22/063 702/58 |
| 2014/0337107 A1 | 11/2014 | Foster | |
| 2015/0227522 A1 | 8/2015 | O'Donnell et al. | |
| 2015/0227846 A1 | 8/2015 | Mercer et al. | |
| 2015/0254246 A1 | 9/2015 | Sheth et al. | |
| 2015/0267935 A1 | 9/2015 | Devenish et al. | |
| 2015/0269664 A1 | 9/2015 | Davidson | |
| 2015/0300831 A1 | 10/2015 | Sernicola | |
| 2015/0310019 A1 | 10/2015 | Royer et al. | |
| 2015/0310463 A1 | 10/2015 | Turfboer et al. | |
| 2015/0310465 A1 | 10/2015 | Chan et al. | |
| 2015/0319119 A1 | 11/2015 | Ryu et al. | |
| 2015/0324819 A1 | 11/2015 | Lin et al. | |
| 2015/0326679 A1 | 11/2015 | Lin et al. | |
| 2016/0005015 A1* | 1/2016 | Curtis | G06Q 20/145 705/40 |

FOREIGN PATENT DOCUMENTS

| | | |
|---|---|---|
| CA | 2832211 | 11/2012 |
| DE | 3703387 | 8/1987 |
| DE | 102011077522 | 12/2012 |
| EP | 0003010 | 7/1979 |
| EP | 2705440 | 3/2014 |
| EP | 2496991 | 9/2014 |
| GB | 1525656 | 9/1978 |
| GB | 2238405 | 5/1991 |
| JP | 2000-270379 | 9/2000 |
| JP | 2004-233118 | 8/2004 |
| JP | 2006-119931 | 5/2006 |
| JP | 2007-133468 | 5/2007 |
| JP | 2011-027305 | 2/2011 |
| JP | 2012-080679 | 4/2012 |
| JP | 2012-080681 | 4/2012 |
| JP | 2013-020307 | 1/2013 |
| WO | WO 03/102865 | 12/2003 |
| WO | WO 03/104941 | 12/2003 |
| WO | WO 2008/101248 | 8/2008 |
| WO | WO 2009/085610 | 7/2009 |
| WO | WO 2011/057072 | 5/2011 |
| WO | WO 2012/112358 | 8/2012 |
| WO | WO 2012/154566 | 11/2012 |
| WO | WO 2014/004148 | 1/2014 |
| WO | WO 2014/182656 | 11/2014 |

OTHER PUBLICATIONS

International Preliminary Report on Patentability for PCT Application No. PCT/US2010/055621, dated May 15, 2012, 8 pages.

International Search Report and Written Opinion for PCT Application No. PCT/US2010/055621, dated Dec. 23, 2010, 9 pages.

International Search Report and Written Opinion for PCT Application No. PCT/US2012/036539, dated Jul. 6, 2012, 8 pages.

International Preliminary Report on Patentability for PCT Application No. PCT/US2012/036539, dated Nov. 21, 2013, 7 pages.

International Search Report and Written Opinion for PCT Application No. PCT/US2013/046126, dated Aug. 22, 2013, 9 pages.

International Preliminary Report on Patentability for PCT Application No. PCT/US2013/046126, dated Jan. 8, 2015, 8 pages.

International Search Report for PCT Application No. PCT/US2014/036901, dated Aug. 28, 2014, 3 pages.

Patent Examination Report No. 1 for Australian Patent Application No. 2010315015, dated Dec. 17, 2013, 3 pages.

Extended European Search Report for European Patent Application No. 12782569.3, dated Nov. 27, 2014, 7 pages.

Aragon, Liz, "Black and White Emoticons," posted at Sweet Clip Art, posting date Apr. 29, 2012. © 2011 2015 Elizabeth J. Aragon, available at http://sweetclipart.com/backandwhiteemoticons838>.

Author Unknown, "An Inconvenient Truth," Jan. 9, 2008, 2 pages, available at http://web.archive.org/web/2008019005509/http://www.climatecrisis.net/takeaction/carbonca/.

Author Unknown, "Calculate Your Impact," Jul. 28, 2008, 4 pages, available at http://web.archive.org/web/20080728161614/http://green.yahoo.com/calculator/.

Author Unknown, "Carbon Footprint Calculator: What's My Carbon Footprint?" The Nature Conservancy, Jul. 8, 2008, 8 pages, available at http://web.archive.org/web/20080708193253/http://www.nature.org/initiatives/climatechange/calculator/2008.

Author Unknown, "CoolClimate Calculator," May 19, 2008, 15 pages, available at http://web.archive.orgl/web/20080519220643/bie.berkeley.edu/coolcale/calculations.html.

Author Unknown, "Lifecycle Climate Footprint Calculator," Berkeley Institute of the Environment, Nov. 23, 2007, 6 pages, available at http://web.archive.org/web/20071123115832/http://bie.berkeley.edu/calculator.

Author Unknown, "More than just a thermostat.," http://www.ecobee.com/, 4 pages, Jul. 16, 2013.

Author Unknown, "Popups Climate Change: Carbon Calculator—Greenhouse Gas and Carbon Dioxide Calculator Wed Pages," The Nature Conservancy, 5 pages, Feb. 29, 2008, available at http://web.archive.org/web/20080229072420/www.nature.org/popups/misc/art20625.html.

Bailey, Timothy, et al., "Fitting a Mixture Model by Expectation Maximization to Discover Motifs in Biopolymers," UCSD Technical Report CS94-351, Proceedings of the Second International Conf. on Intelligent Systems for Molecular Biology, 1994, 33 pages.

Blaine, Joel, "Seven Cities and a Utility Company Team Up to Deliver Energy Savings," posted at Dept. of Energy, posting date (56) References Cited

OTHER PUBLICATIONS

Aug. 1, 2011, available at http://energy.gov/articles/sevencitiesandutilitycompanyteamdeliverresidentialenergysavings>.
Chen, Hanfeng, et al., "Testing for a Finite Mixture Model With Two Components," Journal of the Royal Statistical Society, Series B, vol. 66, No. 1, 26 pages, 2004.
De Prensa, Boletine, "TXU Energy Budget Alerts Give Consumers Control of Electricity Costs," TXU Energy, http://www.txu.com/es/about/press, 2 pages, May 23, 2012.
Deb, Partha, "Finite Mixture Models," Hunter College and the Graduate Center, CUNY NBER, FMM Slides, 42 pages, Jul. 2008.
D'Urso, M., et al., "A Simple Strategy for Life Signs Detection Via an X-Band Experimental Set-Up," Progress in Electromagnectics Research C, vol. 9, pp. 119-129 (2009).
Eckmann, J.P., et al., "Ergodic theory of chaos and strange attractors," Reviews of Modern Physics, vol. 57, No. 3, Part I, pp. 617-656, Jul. 1985.
Espinoza, Marcelo, et al., "Short-Term Load Forecasting, Profile Identification, and Customer Segmentation: A Methodology Based on Periodic Time Series," IEEE Transactions on Power Systems, vol. 20, No. 3, pp. 1622-1630, Aug. 2005.
Fels, Margaret F., "PRISM: An Introduction," Elsevier Sequoia, Energy and Buildings, vol. 9, pp. 5-18, 1986.
Fels, Margaret F., et al., Seasonality of Non-heating Consumption and Its effect on PRISM Results, Elsevier Sequoia, Energy and Buildings, vol. 9, pp. 139-148, 1986.
Figueiredo, Vera, et al., "An Electric Energy Consumer Characterization Framework Based on Data Mining Techniques," IEEE Transactions on Power Systems, vol. 20, No. 2, pp. 596-602, May 2005.
Fitbit® Official Site, "Flex, One & Zip Wireless Activity & Sleep Trackers," http://www.fitbit.com/, 4 pages, Jul. 15, 2013.
Freepik, Surprised emoticon square face with open eyes and mouth, posted at Flat Icon, posting date not given. © 2013-2015 Graphic Resources SL, available at http://www.flaticon.com/freeicon/surprisedemoticonsquarefacewithopeneyesandmouth_ 42835>.
Friedman, Jerome, et al., "Regularization Paths for Generalized Linear Models via Coordinate Descent," Journal of Statistical Sotfware, vol. 33, Iss. 1, pp. 1-22, Jan. 2010.
Gelber, Bob, "This Is Not a Bill," posted at Not a Mystery, posting date 4/1812015, available at http://notamystery.com/2015/04/18/not_worth_the_papeUts_printed_on/>.
Goldberg, Miriam L., et al., "Refraction of PRISM Results into Components of Saved Energy," Elsevier Sequoia, Energy and Buildings, vol. 9, pp. 169-180, 1986.
Jansen, R.C., "Maximum Likelihood in a Generalized Linear Finite Mixture Model by Using the EM Algorithm," Biometrics, vol. 49, pp. 227-231, Mar. 1993.
Jawbone, "Know yourself. Live better." https://jawbone.com/up/, 7 pages, Jul. 15, 2013.
Karsten, "Green nudge: The classic social comparison experiment by Opower," posted at iNudgeyou, posting date Nov. 28, 2012, available at http://inudgeyou.com/greennudgetheclassicsocialcomparisonexperimenbyopower/>.
Laskey, Alex, et al., "OPOWER," posted at ACM, posting date Jun. 2011, Copyright © 2015 by the ACM, available at http://xrds.acm.org/article.cfm?aid=1961687>.
Leisch, Friedrich, "FlexMix: A General Framework for Finite Mixture Models and Latent Class Regression in R," Journal of Statistical Software, http://www.istatsoft.org/, vol. 11 (8), pp. 1-18, Oct. 2004.
Liang, Jian, et al. "Load Signature Study—Part II: Disaggregation Framework, Simulation, and Applications," IEEE Transactions on Power Delivery, vol. 25, No. 2, pp. 561-569, Apr. 2010.
Liang, Jian, et al., "Load Signature Study—Part I: Basic Concept, Structure, and Methodology," IEEE Transactions on Power Delivery, vol. 25, No. 2, pp. 551-560, Apr. 2010.
Marshall, Jonathan, "PG&E Home Energy Reports Stimulate Big Customer Savings," posted at PG&E Currents, posting date May 14, 2014, © 2014 Pacific Gas and Electric Company, available at http://www.pgecurrents.com/2014/05/14/pgehomeenergyreports-stimulatebigcustomersavings/>.
Mint.com, "Budgets you'll actually stick to," Budgeting-Calculate and Categorize your spending, https://www.mint.com/how-it-works/budgeting/, 2 pages, Jul. 12, 2013.
Mint.com, "We're always on alert." Alerts for bills, fees & going over budget, http://www.mint.com/how-it-works/alerts/, 2 pages, Jul. 12, 2013.
Morabito, Kerri, "High User Campaign," posted at Kerri Morabito, posting date not given, © Kerri Morabito, 2015, available at <URL: http://www.kerrimorabito.com/high-user-campaign.html>.
Mori, Hiroyuki, "State-of-the-Art Overview on Data Mining in Power Systems," IEEE, pp. 33-37, 2006.
Muthen, Bengt, et al., Finite Mixture Modeling with Mixture Outcomes Using the EM Algorithm, Biometrics, vol. 55, pp. 463-469, Jun. 1999.
Nest, "The Learning Thermostat," http://www.nest.com/, 2 pages, Jul. 15, 2013.
Nike.com, "Nike + FuelBand. Tracks your all-day activity and helps you do more . . . ," http://www.nike.com/us/en_us/c/nikepius-f..uelband. 7 pages, Jul. 15, 2013.
Rocheleau, Jake, "38 Amazingly Well-Designed Emoji Iconsets," posted at SpyreStudios, posting date Mar. 25, 2015, SpyreStudios © 2015, available at http://spyrestudios.com/38welldesignedemojiiconsets/>.
Rose, O. "Estimation of the Hurst Parameter of Long-Range Dependent Time Series," University of Wuirzburg, Institute of Computer Science, Research Report Series, Report No. 137, 15 pages, Feb. 1996.
Sawka, Michael N., et al., "Human Adaptations to Heat and Cold Stress," RTOMP-076, 16 pages, Oct. 2001.
Stephen, Bruce, et al. "Domestic Load Characterization Through Smart Meter Advance Stratification," IEEE Transactions on Smart Grid, Power Engineering Letter, vol. 3, No. 3, pp. 1571-1572, Sep. 2012.
Stoop, R., et al., "Calculation of Lyapunov exponents avoiding spurious elements," Physica D 50, pp. 89-94, May 1991.
Wang, Xiaozhe, et al. "Rule induction for forecasting method selection: meta-learning the characteristics of univariate time series," Faculty of information Technology, Department of Econometrics and Business Statistics, Monash University, pp. 1-34.
Wang, Xiaozhe, et al., "Characteristic-Based Clustering for Time Series Data," Data Mining and Knowledge Discovery, Springer Science & Business Media, LLC, vol. 13, pp. 335-364 (2006).
Wehrens, Ron, et al. "Self- and Super-organizing Maps in R: The kohonen Package," Journal of Statistical Software, vol. 21, Iss. 5, pp. 1-19, Oct. 2007.
Wikipedia, "Akaike information criterion," 6 pages, Aug. 17, 2012.
Wikipedia, "Mixture model," 10 pages, Oct. 7, 2012.

\* cited by examiner

IDENTIFICATION OF PEAK DAYS

BACKGROUND

1. Technical Field

The disclosed technology relates to systems and methods for forecasting peak demand events (i.e., for a consumable resource), and in particular, for facilitating the prediction of peak demand events based on historic weather and resource consumption data that do not rely on resource production capacity.

2. Introduction

Some utilities, such as power providers, are interested in the occurrence of peak demand events, such as the forecasting of peak demand days. However, because a major concern for many utilities is reducing demand for the purpose of avoiding auxiliary energy production, peak demand is often conceptualized as a measure of electricity demand approaching or exceeding total production capacity. Consequently, peak demand events, as understood by many utility providers, are not informative measurements for determining when resource consumption demand may be reduced generally, for example, using demand response (DR) or behavioral demand response (BDR) applications at times when total demand is well below production capacity.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

The disclosed subject matter relates to a computer-implemented method for identifying a peak consumption threshold based on an analysis of historic consumption data. In some aspects, the method can include steps for receiving, (e.g., using the one or more processors), resource consumption data for a plurality of utility customers, wherein the resource consumption data comprises an indication of an amount of at least one consumable resource used by each of the plurality of utility customers, segmenting the resource consumption data into one or more consumption categories, and calculating, using the one or more processors, a consumption average for each of the one or more consumption categories. In some aspects, the steps can further include identifying, a peak consumption threshold for at least one of the one or more consumption categories, wherein the peak consumption threshold for the at least one each of the one or more consumption categories is based on the consumption average for the corresponding consumption category.

In another aspect, the disclosed subject matter relates to a computer-implemented method for calculating a peak consumption threshold, the method including steps for receiving resource consumption data for a plurality of utility customers, wherein the resource consumption data comprises an indication of an amount of electric power used by each of the plurality of utility customers, calculating a consumption average for the resource consumption data, and calculating a peak consumption threshold based on the consumption average for the resource consumption data.

In yet another aspect, the disclosed subject matter relates to an apparatus comprising at least one processor configured for executing operations including: receiving resource consumption data for a plurality of utility customers, wherein the resource consumption data comprises an indication of an amount of electric power used by each of the plurality of utility customers, calculating a consumption average for the resource consumption data, and calculating a peak consumption threshold based on the consumption average for the resource consumption data.

It is understood that other configurations of the technology will become readily apparent to those skilled in the art from the following detailed description, wherein various configurations of the subject technology are shown and described by way of illustration. The subject technology is capable of other and different configurations and its several details are capable of modification in various respects without departing from the scope of the subject technology. Accordingly, the detailed description and drawings are to be regarded as illustrative and not restrictive in nature.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

As used herein the term "model" refers generally to a description or representation of a system. The description or representation can use mathematical language, such as in the case of mathematical models. Examples of types of models and/or characteristics of models, without limitation, can include: lookup tables, linear/non-linear, deterministic, probabilistic, static, dynamic, machine-learning implementations, and models having lumped parameters and/or distributed parameters.

It will be appreciated that the systems and methods presented by this disclosure are novel, as are applications thereof and many of the components, systems, methods and algorithms employed and included therein. It should be appreciated that aspects of the presently described inventive body of work can be implemented in numerous ways, including as processes, apparatuses, systems, devices, methods, computer readable media, computational algorithms, embedded or distributed software and/or as a combination thereof.

Aspects of the technology address the foregoing problems by providing ways to define and forecast peak resource consumption events (e.g., "peak events") based on historic resource consumption patterns and weather data. In some implementations, a regression model is used to relate historic resource consumption (e.g., power consumption) with corresponding weather data for similar time periods. By way of example, regression models may be used to relate resource consumption with weather data for a defined time envelope, such as a particular season, e.g., the summer months.

After the predictive model is constructed or generated, power consumption values are determined within a specific timeframe and used to define peak demand levels (e.g., "peak demand thresholds"), above which, resource consumption is considered to be at a "high" or "peak level." Depending on implementation, a peak demand threshold may be defined as a percentage or multiple of the consumption average for a given time. In this manner, peak demand event thresholds are set using actual consumption data for a particular area, over a predetermined time period. That is, peak demand thresholds are determined based on historic consumption patterns, providing a way to define high/peak use, without regard to actual resource production capacity. Accordingly, utilities that have sufficient capacity may still be able initiate demand response events to shed peak load throughout certain (e.g., summer) peak days or peak hours. The technology may also enable utilities with sufficient capacity to focus instead on maximizing energy efficiency to meet governmental mandates, to meet consumer demands, to reduce competitive market churn, or for other reasons.

In some aspects, consumption values calculations are performed using consumption data from similar time periods, such as similar days. For example, consumption values may be calculated for similar weather days, such as days of a common season, e.g., summer days. Other qualities or considerations may also be used to determine "similar days," for which corresponding consumption data may be used, without departing from the subject technology. By way of example, "similar days" determinations may be based on one or more of the following qualities or considerations: same season, same day of week (e.g., same weekday or weekday/weekend designation), same holiday designation (e.g., holiday/not-holiday), etc.

By relating consumption patterns with weather data for a predetermined time period, the likelihood of a future peak demand event may be predicted for forecasted weather events in a given season, or on a given date, and/or for similarly situated consumers. Accordingly, a "peak days" forecast of the subject technology is amenable to consumption reduction techniques, such as with demand response (DR) and/or behavioral demand response (BDR) implementations, as will be discussed in further detail below.

Figure 1:
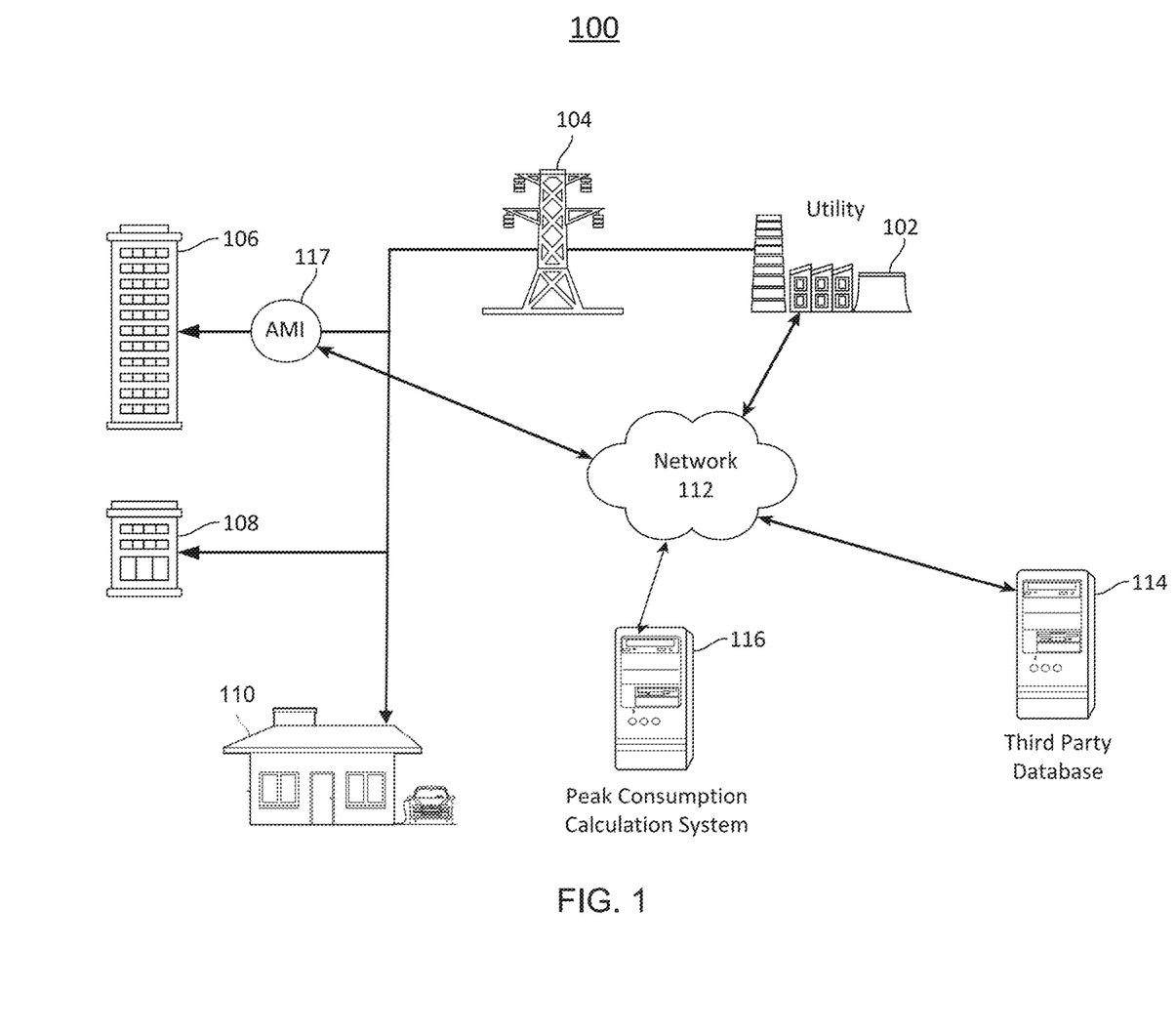
FIG. 1 illustrates an example environment in which resource consumption information can be collected for use in calculating a peak consumption threshold, according to some aspects of the technology.

FIG. 1 illustrates an example environment 100, in which resource consumption information can be collected (e.g., for one or more utility customers) and used to calculate a peak consumption threshold. Although several of the provided examples provided below relate to the calculation of peak consumption thresholds for electric power, it is understood that consumption threshold/s may be similarly calculated for a variety of consumable resources, including without limitation: water, and natural gas.

As illustrated, environment 100 includes utility 102 that is communicatively connected to multiple resource consumption sites (e.g., businesses 106, 108, and residential location 110) via power infrastructure 104. In the example of environment 100, utility 102 represents a provider of electric power; however, additional (or alternative) resource providers, such as water or gas utility providers, may be present without departing from the scope of the invention.

Environment 100 also includes a peak consumption calculation system 116 (i.e., "calculation system 116"), and third-party database 114, that are communicatively connected to one another, as well as utility 102 via network 112. Although calculation system 116 and third-party database 114 are depicted as discrete systems, it is understood that each may comprise distributed hardware systems and/or software modules that are interconnected via network 112, such as a computing cluster.

In some embodiments, network 112 may be communicatively coupled to one or more Advanced Metering Infrastructure devices (e.g., AMI 117) that are configured for transmitting data including an indication of a time and an amount of consumable resource consumed at a respective consumption site. Further to the illustrated example, AMI 117 is configured to communicate energy consumption information for business location 106 to calculation system 116 and/or utility 102, e.g., via network 112. It is understood that additional AMI devices may be used (e.g., at one or more consumption sites) without departing from the subject technology. Additionally, smart metering devices can be configured to report resource consumption at different time granularities, depending on the desired implementation. For example, AMI 117 may report electric energy consumption data for building location 106 on a monthly, weekly, daily, hourly, and/or minute-by-minute basis.

Third party database 114 represents one or more third-party systems that can be used to provide data supplemental to resource consumption statistics collected by calculation system 116. By way of example, third party database 114 may be configured to collect and report historic and/or forecasted weather data, utility and/or customer demographic information to calculation system 116. As discussed in further detail below, provided weather information, and/or demographic information that may be correlated with consumption data for one or more utility customers or consumption locations.

In practice, calculation system 116 is configured to receive resource consumption data from one or more sources, including but not limited to utility 102 and/or AMI 117, for a number of consumption sites and/or utility customers. Received consumption data can represent historic consumption amounts for one or more consumable resources (e.g., electric power, water, and/or natural gas), over a predetermined time period and for a specific geographic region. In some implementations, resource consumption data collected by calculation system 116 may be associated with particular utility customers, such as a selected subset of total utility customers serviced by utility 102.

Weather data is also received by calculation system 116, e.g., from a weather provider or weather service, such as third party database 114. Weather data (or weather information) can include various types of measurements relating to environmental conditions for a particular geographic region or regions. By way of example, weather data may include information regarding temperature, humidity, wind speed, solar exposure, and/or qualitative indicators identifying a particular type of weather phenomena (e.g., rain, fog, and/or hail, etc.).

Additionally, received weather data may specifically pertain to a particular time period, such as a season, specific dates (e.g., holidays or non-holidays), or days of the week (e.g., weekdays or weekends), etc. In some approaches, collection of weather data can be performed at different time granularities. For example, various types of weather information may be collected on a daily, time-of-day (e.g., morning and/or nightly), or hourly basis. By way of example, weather data for a particular geographic region may represent a pairing of high/low temperature information together with humidity indication. For example, weather data for a given date may be: 81° F./56%-65° F./66%, indicating an eighty-one degree high temperature with fifty-six percent relative humidity, and a sixty-five degree low temperature, with a sixty-six percent relative humidity.

Weather data received by calculation system 116 is correlated with consumption data for corresponding times. As discussed in further detail below with respect to FIGS. 3-4B, calculation system 116 can process received consumption data to correlate particular consumption values (such as a consumption average for a particular day or other period of time) with weather data (such as temperature minimums or maximums for the day or other period of time). Calculation system 116 can be configured to further determine (or identify) threshold consumption amounts, above which, resource consumption may be considered to be at a "peak level." Thresholds distinguishing normal consumption from "peak consumption" may be identified or calculated in different ways, depending on the desired implementation.

In some aspects, the peak consumption threshold may be automatically determined based on calculations performed on the received consumption data, such as consumption values (e.g., consumption averages) calculated on certain days and/or corresponding with particular weather events (e.g., temperature minimums or maximums). For example a peak consumption threshold may be defined as a multiple of the average daily resource consumption, e.g., for a particular time period. In a similar manner, peak consumption thresholds may be defined based on a percentage of maximum consumption, or as a multiple of the median consumption for one or more resource consumers (e.g., electric power subscribers of utility 102).

In other implementations, the peak consumption threshold may be determined by a user/operator of calculation system 116. For example, the resource consumption threshold may be set manually by an administrator, and/or manually adjusted/updated based on overall system performance, as discussed in further detail below.

Calculation system 116 can use the received consumption data, calculated consumption values, correlated weather data, and determinations of peak consumption thresholds to build/generate one or more predictive models for predicting future peak events. The type of predictive model can vary depending on the desired implementation. For example, the predictive model may comprise a linear regression model, a polynomial regression model, and/or piecewise regression model incorporating two or more linear or polynomial fit approximations. In other implementations, the predictive model may comprise a machine-learning method, such as an automatically updating neural network, or a support vector machine implementation.

In some aspects, wherein a regression model is used, future (forecasted) weather data (e.g., maximum or minimum temperatures) may be received by calculation system 116 and used to determine a probability that resource consumption (at the forecasted temperature condition) will exceed the peak consumption threshold. A more detailed overview of process for constructing and implementing a predictive model is provided with respect to FIG. 2, below.

Figure 2:
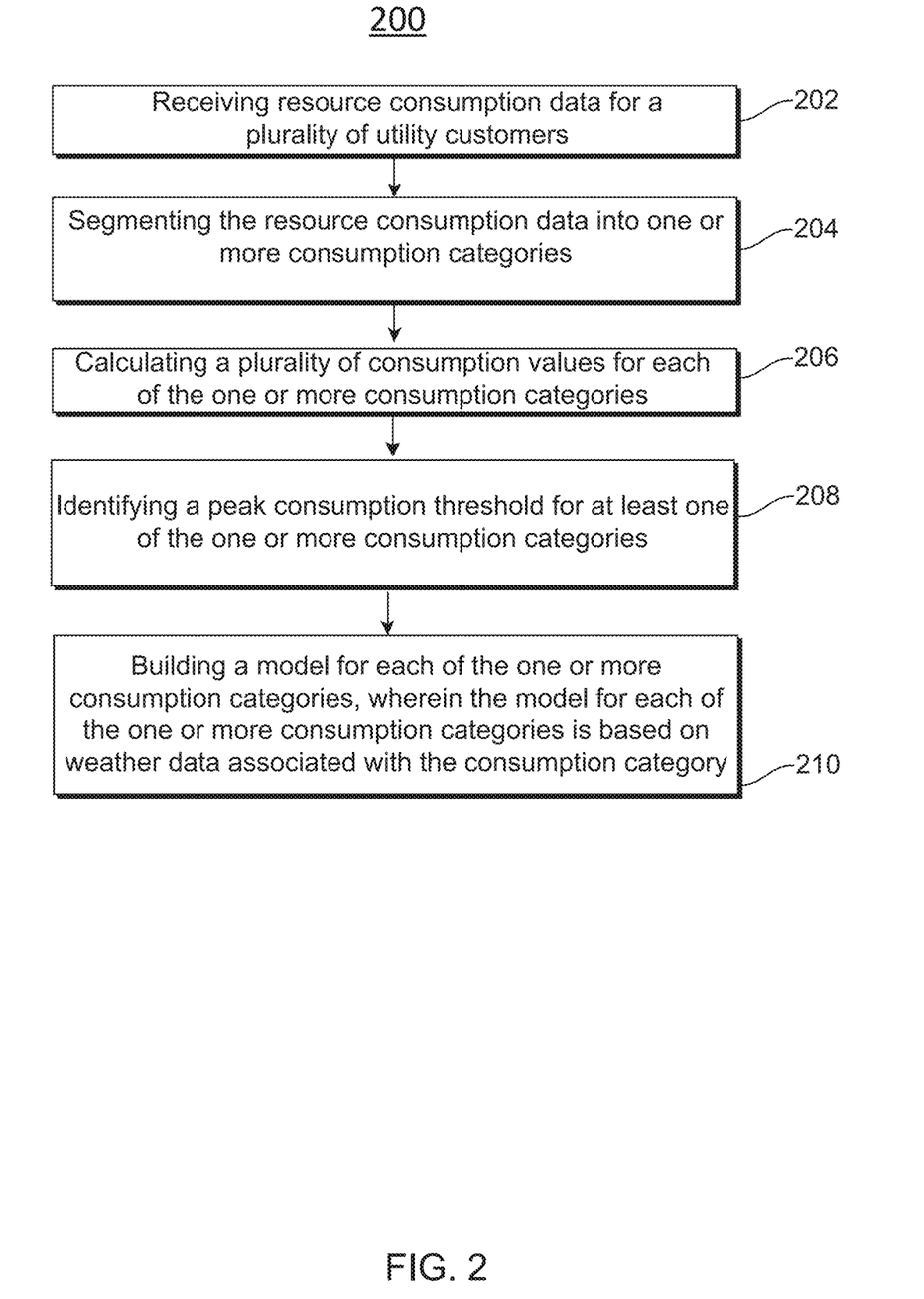
FIG. 2 illustrates steps of an example process for identifying a peak consumption threshold, according to some aspects of the technology.

Specifically, FIG. 2 illustrates steps of an example method/process 200 for identifying a peak consumption threshold. Method 200 begins with step 202 in which resource consumption data is received (e.g., by a calculation system, such as calculation system 116, discussed above). Received resource consumption data can correspond with specific utility customers, or with a specific consumption location, such as a residence or business or business address. Further to the example illustrated with respect to FIG. 1, resource consumption data may be received from smart metering devices (e.g., AMI 117) and/or from utility 102 (i.e., one or more utility operated databases/servers), which provide consumption data for consumption sites with or without smart meter functionality (e.g., business 108 and residence 110).

In step 204, resource consumption data is segmented into one or more consumption categories. Segmentation of resource consumption data can be performed so that consumption similarities (e.g., as between a single customer at different times, or multiple customers) can be used to establish respective peak thresholds for a specific category of use, time of use or class of consumer. In this manner, for example, consumption on similar days (e.g., weekdays, weekends, holidays, summer days, winter days, weekdays in June, etc.), consumption in a particular geographic region, and/or consumption by similar customers/subscribers (e.g., customers in a particular geographic area, residential customers, customers with single-family homes, customers who own their homes, renters, etc.) can be performed with greater accuracy.

Segmentation of resource consumption data can be performed based on a variety of factors or qualities, including without limitation: time-period similarities, subscriber similarities, and/or consumption site similarities. By way of example, resource consumption data segmented based on time period may be performed such that resource consumption for highly similar time periods is aggregated into a common consumption category. Thus, a consumption category may be established for consumption data relating to similar seasons, similar days of the week, and/or similar times of day, etc.

Segmentation of consumption data based on subscriber similarities may be performed, either alone or in conjunction with time-period segmenting, based on customer demographic information, including, without limitation: income information, location, occupation, age, electric-vehicle ownership status, and/or solar panel ownership status, etc. By segmenting consumption data based on customer demographic information, associated consumption categories can include resource consumption information for customers of a similar type that can be used to improve the identification of peak consumption thresholds.

By way of example, segmentation of consumption data based on consumption site similarities can be performed such that consumption data for similar building types can be easily grouped and compared. For example, received consumption data may be segmented so that consumption statistics for single family residences, multi-family buildings, and/or retail commercial locations is similarly grouped. Segmentation of consumption data based on consumption site qualities can improve predictive models for the corresponding consumption category by ensuring that similar use types are properly grouped.

In some approaches, segmentation of consumption data can also include the segmentation of corresponding weather data for each of the respective consumption categories. For example, consumption data for each consumption category can be paired with weather data corresponding with a time/location of the associated consumption data. By way of example, consumption data collected for week days in the 92122 zip code may be associated with weather in the 92122 zip code, for the same week days.

In step 206, a plurality of consumption values for each of the consumption categories are calculated based on the received resource consumption data. The computation of consumption values may vary depending on the desired implementation. For example, consumption values may correspond with averages representing average resource (e.g. electric energy) consumption for a set of customers during a specific time period (e.g., on a particular day). In some aspects, consumption averages may correspond with (or may be correlated with) weather data, such as maximum or minimum temperature values for the specific time period (e.g., week, day, hour, etc.). As such, each temperature measurement within a given time period may be paired with a measure of average consumption for a set of customers (e.g., of the consumption category) at that temperature. Further examples relating to a scatter plot of calculated (daily) electric energy consumption averages and correlated maximum temperature are discussed in conjunction with FIG. 4A, below.

The calculation of consumption values can include the calculation of other statistics that may be (additionally or alternatively) calculated using the respective consumption data. Such calculations can include, without limitation, median, mean, and/or percentile statistics. In some aspects, high and low values (e.g., outliers beyond a particular standard deviation) for a particular consumption category may be removed, or thrown out, from the calculation of statistics used to describe the category in order to reduce category calculation errors.

In step 208, a peak consumption threshold for at least one of the consumption categories is identified. As discussed above, peak consumption thresholds can represent a resource consumption amount, above which, consumption levels are deemed to be "high," "excessive." As discussed in further detail below, consumption exceeding or forecasted to exceed the peak consumption threshold may be determined to be an indicator that conservation measures are needed, such as through the deployment of demand response (DR) or behavioral demand response (BDR) techniques.

Although the peak consumption threshold for any consumption category may be determined using various parameters, in some aspects, the peak consumption threshold is based on a percentage or multiple of the average consumption for the consumption category. However, other peak consumption thresholds may be identified using statistics derived from resource consumption data, without departing from the scope of the subject technology.

By way of example, the peak threshold may be identified as 125% of the consumption category average. By way of further example, the peak consumption threshold may be identified as a percentage of the maximum for the category (e.g., 85% of the maximum consumption average), a percentile threshold (e.g., the top $80^{th}$ percentile of average daily consumption values), etc. Other computations of peak consumption threshold that are based on the consumption data may be performed without departing from the scope of the subject technology.

By computing the peak consumption threshold based on quantitative features of actual historic consumption data, the identified peak consumption threshold is not dependent upon utility capacity or instantaneous resource demand. Thus, peak consumption thresholds based on historic consumption data can be utilized to determine when demand response programs can be initiated in order to reduce resource consumption, irrespective of absolute demand or use.

In step 210, a model (e.g., a predictive model) for each of the one or more consumption categories is built or generated. In some implementations, the models for each consumption category can facilitate the prediction of future peak demand events, for example, relating to customers of that consumption category. The constructed model may accept predicted or forecasted weather information (input) and in turn, yield a probability that resource consumption corresponding with the weather information will exceed the identified peak consumption threshold (output).

As discussed above, models generated for each consumption category may be regression models (e.g., a linear regression model, a polynomial regression model, a piecewise/segmented regression model, etc.), or a machine-learning model, such as that which is implemented using a neural network. Further details regarding the implementation of a predictive peak consumption model are discussed with respect to the example process of FIG. 3.

Figure 3:
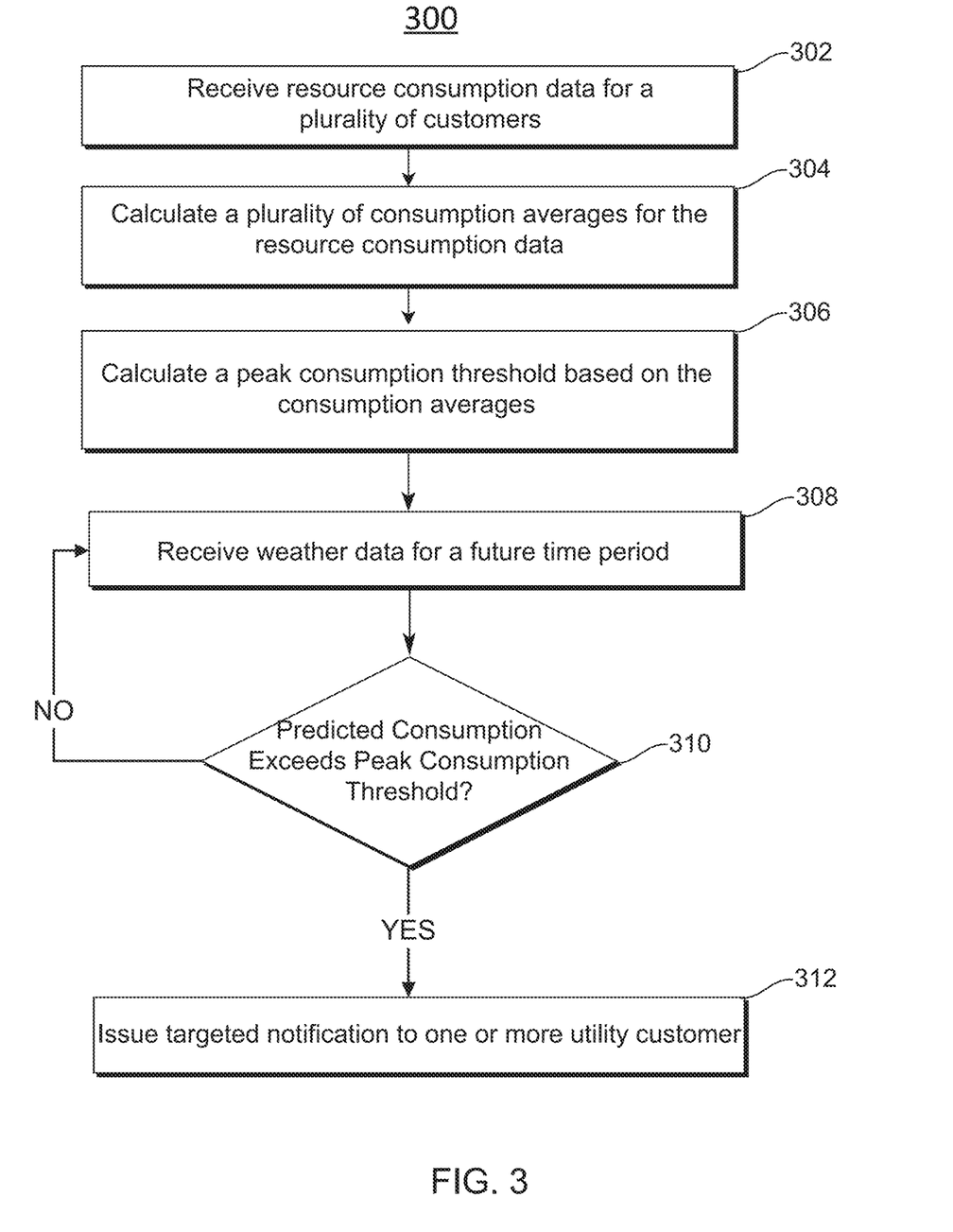
FIG. 3 illustrates an example process for predicting peak consumption events and generating corresponding customer notifications, according to some aspects of the technology.
Figure 4A:
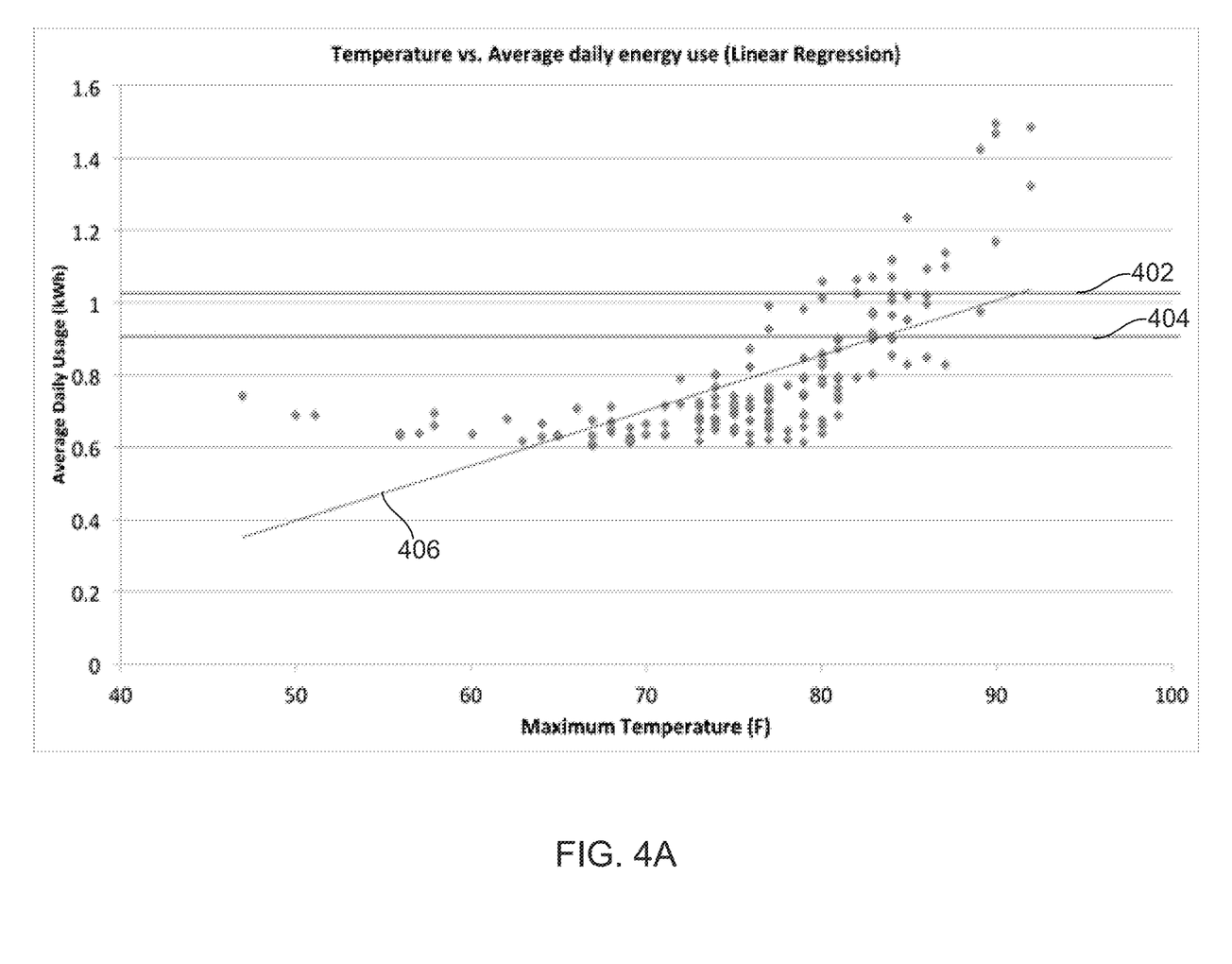
FIG. 4A illustrates an example of a graphical relationship between power consumption and temperature, according to some aspects.

FIG. 3 illustrates an example process 300 for calculating a peak consumption threshold and issuing targeted notifications to one or more utility subscribers. Process 300 begins with step 302 in which resource consumption data is received for a plurality of customers. Resource consumption data can be received by a calculation system, e.g., peak consumption calculation system 116, from a third party or third party device, such as a utility provider 102, AMI 117 and/or third party database 114, discussed above. In some aspects, the resource consumption data can include, or may be associated with, various other types of information, such as subscriber demographic information (e.g., providing demographic information for one or more utility customers), and/or weather data that is correlated in time with the respective consumption data.

In step 304, a plurality consumption averages are calculated for the received resource consumption data. By way of example, the consumption averages can be calculated by calculating an average of resource consumption values (e.g., electric energy consumption amounts) provided by the received consumption data. Consumption averages for the resource consumption data may be computed for subsets of the data, for example, belonging to particular resource consumption categories discussed above with respect to FIG. 2. Similar to process 200 discussed above, other statistical features of the received resource consumption data may also be calculated, including but not limited to: mean, median, mode and/or standard deviation statistics.

In step 306, a peak consumption threshold is calculated based on the consumption averages calculated in step 304. Depending on implementation, the peak consumption threshold can be defined as a percentile ranking of the calculated consumption averages (e.g., the peak consumption threshold may be defined/identified at the $90^{th}$ percentile of the consumption averages, such that 90% of the consumption average data points in the set fall at or below the identified peak consumption threshold). In other aspects, the peak consumption threshold may be defined using various other statistics calculated for the resource consumption data set, or based on a variety (combination) of calculations.

By way of example, the peak consumption threshold may be defined as a percentile of the consumption averages calculated in step 304. Alternatively, the peak consumption threshold may be defined as percentile of the resource consumption data, such as a multiple of standard deviations above the mean or median, etc. In a further example, the peak consumption threshold may be calculated or set at the $80^{th}$ percentile, or $90^{th}$ percentile, indicating that 80% or 90% of consumption figures in the consumption data fall below the consumption threshold, respectively. In some alternative embodiments, the peak consumption threshold may be manually set or identified, for example, by a user or administrator of the calculation system, e.g., calculation system 116, described above.

In step 308, weather data is received for a future time period. The weather data can include one or more environmental variables, such as temperature (e.g., high/low temperature indications), humidity, wind-speed and/or wind-direction, etc. Additionally, weather data can include qualitative indications of weather phenomena, such as but not limited to: precipitation indications (e.g., rain, snow, hail, etc.), lightening, cloud coverage, visibility (e.g., relating to snow, rain or fog), etc.

In step 310, forecasted weather data can be used as an input to a predictive model (e.g., as discussed above with respect to step 201 of FIG. 2), to determine a likelihood that resource consumption at a future time of the forecasted weather (e.g., maximum or minimum temperature) will exceed the predetermined peak consumption threshold (see step 306). Specifically, such determinations may be made using a predicative model, such as a regression model relating historic weather data with the received resource consumption data (see step 302).

In alternative implementations, other predictive models may be used, including machine-learning implementations that utilize an automatic feedback neural network. In such implementations, predictions of future resource demand can be verified (e.g., determined to be correct or incorrect) and the result can be used to update the predictive model accordingly.

As illustrated in decision step 310, if it is determined that the predicted consumption amount has a low likelihood of exceeding the peak consumption threshold, then process 300 proceeds to step 308 in which additional weather data for one or more future time periods is received. Alternatively, it is determined that a predicted consumption has a high likelihood of exceeding the consumption threshold, process 300 proceeds to step 312 in which targeted notifications are issued to one or more utility customers. That is, determinations of a high likelihood of excessive resource consumption can be used to automatically trigger resource conservation or reduction techniques using targeted/individualized customer notifications. Determinations of a "high likelihood" and a "low likelihood" that a predicted consumption amount will exceed a given peak demand threshold may vary with implementation. For example, a forecasted consumption having a 50% or greater likelihood of exceeding the peak consumption threshold may be considered to be a "high likelihood," whereas smaller percentages would constitute a "low likelihood." Similar to the determination/identification of peak consumption thresholds, the boundary between a "low likelihood" and "high likelihood" may be automatically set, or determined manually, for example, by a user or system administrator.

In step 312, delivery of, targeted notifications can be performed in different ways, and using different communication channels, depending on the desired implementation. For example, targeted notifications can be delivered to customers as part of a behavioral demand response (BDR) program to reduce overall consumption. By implementing (or choosing not to implement) consumption reduction techniques based on peak events (e.g., defined from actual consumption data), aspects of the subject technology can be used to determine when a resource may be conserved, independently of the supply capacity of the resource provider (i.e., power utility).

When aggregated over large numbers of individual consumers or users, consumption reductions can be predictable and therefore treated as a generated resource. When applied to energy consumption, predictive reductions in energy use can be treated as an alternative energy resource. As used herein, BDR techniques relates to changes in resource consumption by end-use customers from their normal consumption patterns, for example, in response to changes in the price of electricity over time, or to various incentives designed to induce lower electricity use. That is, BDR can include all intentional modifications to consumption patterns that can induce customers to alter the timing, level of instantaneous demand, or total resource (e.g., power) consumption.

FIG. 4A illustrates an example graphical relationship between average resource consumption (e.g., of electric power) for various maximum temperatures (weather data) and a corresponding maximum daily temperature, according to some aspects of the technology. In the example scatter plot of FIG. 4A, each point represents a consumption average (e.g., for a set of resource consumption amounts) for a corresponding temperature. That is, the average of aggregated resource consumption amounts for one or more users and/or one or more consumption sites, is computed for a given temperature. Although the example of FIG. 4A illustrates points of average resource consumption at various maximum temperatures, other weather measurements may be used, without departing from aspects of the technology. For example, average consumption amounts may be calculated for points corresponding with minimum temperature amounts, relative humidity measurements, and/or other measures of weather conditions, such as barometric pressure or solar exposure.

In the illustrated example, two potential peak consumption thresholds are identified, i.e., first threshold 402 (indicating a $90^{th}$ percentile cutoff), and second threshold 404 (indicating an $80^{th}$ percentile cutoff). Additionally, fit line 406 illustrates a linear approximation of average daily consumption relative to maximum temperature (e.g., on the corresponding days).

As discussed above with respect to process 300, the identification (or calculation) of first threshold 402 and/or second threshold 404 can be performed automatically based on calculations performed on statistics relating to the received consumption data. Alternatively, the thresholds may be set manually, e.g., by a user or administrator. Using the calculated relationship between average maximum daily usage of electric power (i.e., resource consumption data) and the maximum temperature (weather data), the probability of high resource consumption events for future weather conditions can be predicted.

In the example illustrated by FIG. 4A, a linear regression model is used to make predictions about future weather events. For example, fit line 406 provides a linear approximation of the average consumption for a given maximum temperature. In some aspects, fit line 406 can be used to infer a likelihood that a consumption for a given temperature is likely (or unlikely) to exceed a peak consumption threshold (e.g., first threshold 402 or second threshold 406) Although the example of FIG. 4A illustrates a graphical example of a linear regression model, it is understood that other mathematical models or relationships may be used to predict the likelihood of future peak demand events, without departing from the subject technology. Additionally, it is understood that a regression model may relate average consumption (or other statistical measures of resource consumption) with various other weather measurements or parameters, such as minimum temperature measurements, humidity measurements, pressure measurements, and/or solar exposure, etc.

Figure 4B:
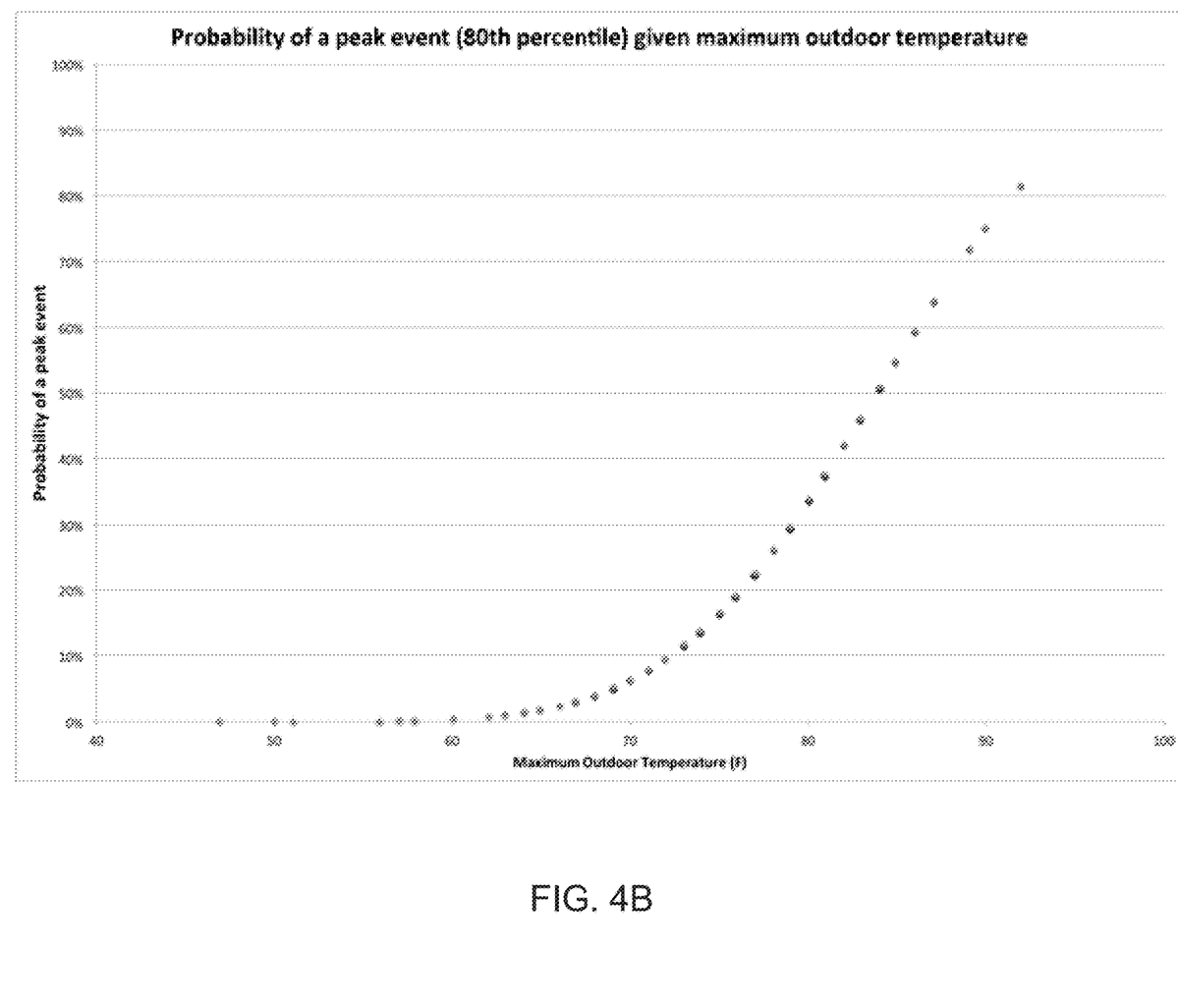
FIG. 4B illustrates an example of a graphical relationship between a peak event probability and maximum outdoor temperature, according to some aspects.

FIG. 4B provides an example of a relationship between a probability of a peak event (using a peak consumption threshold of 80%), and a given maximum outdoor temperature. That is, the points of FIG. 4B indicate a likelihood of reaching or exceeding the $80^{th}$ percentile (i.e., second threshold 404) with respect to a given maximum (outdoor) temperature. As indicated with respect to FIG. 4A, relationships between the probability of a peak event may be graphed against other weather variables (e.g., minimum temperatures, humidity measurements, etc.) without departing from the scope of the technology. As indicated above, various indications (such as user defined thresholds) may be used to determine a cutoff wherein the likelihood of a peak event is great enough to trigger a conservation response. For example, if a probability of a peak event exceeds a user defined threshold (e.g., 50%) the event may be deemed to be "highly likely," thus triggering a conservation response, such as implementation of a BDR technique, as discussed above.

In another example, implementations of a BDR technique (e.g., transmission of a targeted notification to one or more utility customers), may be contingent upon an analysis that considers the cost of sending notifications. For example, if a predetermined cost threshold (i.e., a budget) allowed for up to 5 notifications to be sent during the course of a season/year, and based on historical weather patterns there was a 90% chance that there were 5 days during the season that exceeded the 80th percentile of usage, anything in excess of the 80th percentile may be considered a peak occurrence.

By way of example, a calculation system (e.g., peak consumption calculation system 116) may receive resource consumption data for a plurality of utility customers and/or resource consumption sites. As discussed above, the resource consumption data may be received (via a communications network) from various sources, such as one or more utility providers (e.g., utility 102), one or more smart meter devices (e.g., AMI 117), and/or a third party service provider (e.g., third party database 114). The received consumption data is then be binned or segmented based on common qualities, for example, pertaining to the data, or commonalities relating to associated customers or consumption sites. By way of example, segmentation of the received resource consumption data can be performed to group consumption data for common resource consumption locations, such as residential buildings in a common geographic location (e.g., the same neighborhood) share a similar size characteristic (e.g., an approximate square footage of between 2000 and 2500 square feet).

Once one or more segments (e.g., consumption categories) are formed from the received consumption data, various calculations can be performed on the consumption data. As discussed above with respect to the process detailed in FIGS. 2 and 3, a plurality of consumption values may be generated by processing a given set of resource consumption data. For example, a plurality of consumption averages may be calculated, wherein each consumption average corresponds with a maximum temperature for a corresponding time period.

Once the consumption averages have been calculated, a peak consumption threshold may be determined/identified for the consumption averages, e.g., by a user or administrator of the peak consumption calculation system. As discussed above, the peak consumption threshold identifies a boundary above which resource consumption is considered to be at a "high" or peak level. By defining the peak consumption threshold based on statistical values calculated from received consumption data, determinations of when resource consumption is "high" or at a peak level can be performed independently of energy production capacity. Further to the instant example, the peak consumption threshold may be determined to be set at the $90^{th}$ percentile.

Once the peak consumption threshold is established, the threshold may be used to help determine a likelihood that resource consumption levels for a forecasted weather event (e.g., a maximum or minimum temperature) will exceed the peak consumption threshold. By way of example, weather data may indicate a forecasted high temperature of 90° F. Thus, the forecasted temperature (90° F.) can be provided as an input to a predictive model to determine a likelihood that resource consumption at that temperature will exceed the peak consumption threshold. In some instances, a likelihood of 50% or greater of exceeding the peak consumption threshold triggers initiation of a resource conservation technique, such as implementation of a demand response (DR) or behavioral demand response (BDR) program.

If it is determined that a 90° F. has a 75% likelihood of causing resource consumption to exceed the peak consumption threshold (e.g., the $90^{th}$ percentile), a BDR implementation may be triggered wherein targeted notifications are provided to one or more customers associated with the resource consumption data. As such, the peak consumption threshold of the subject technology may be used to facilitate implementation of energy conservation techniques, without regard to an actual overall measure of utility capacity.

Figure 5:
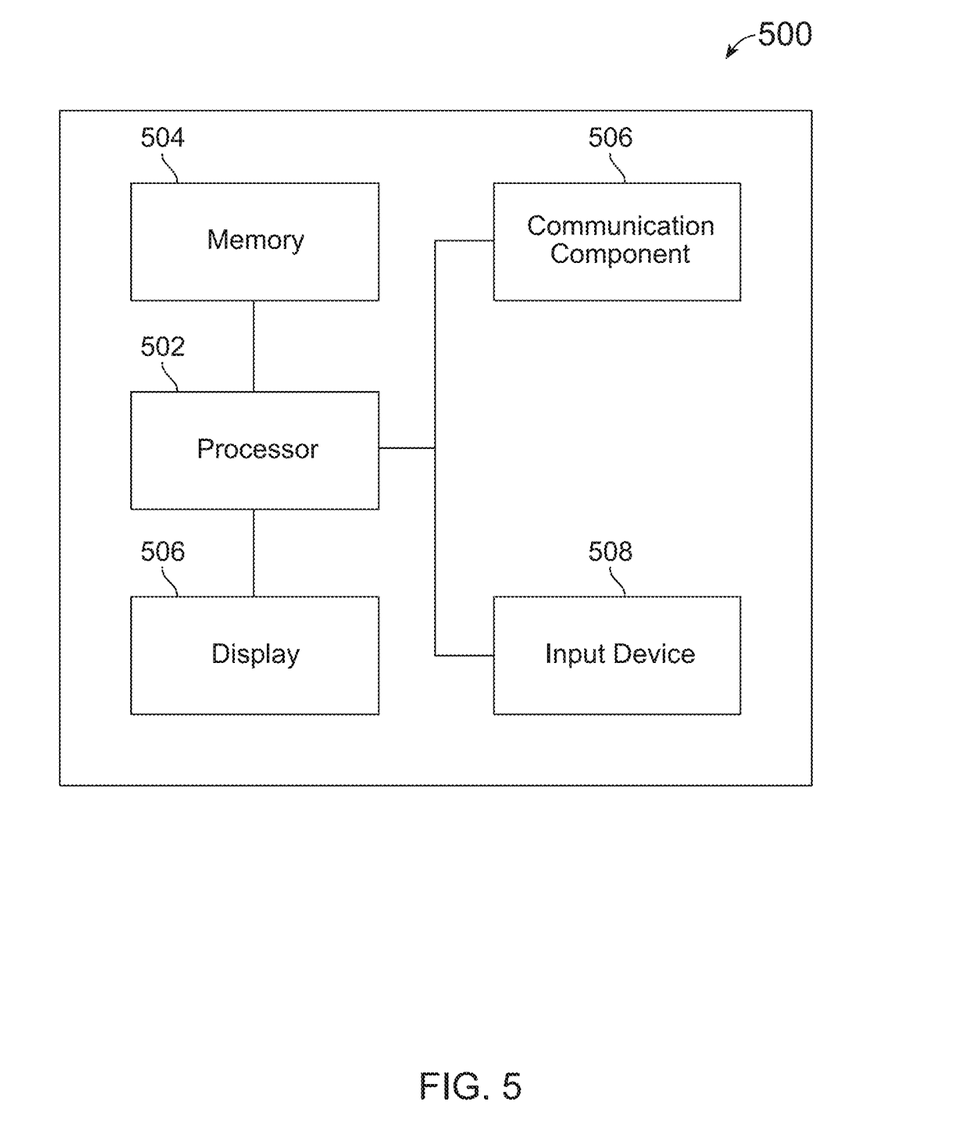
FIG. 5 illustrates an example of an electronic system with which some aspects of the subject technology can be implemented.

FIG. 5 illustrates an example configuration of components of computing device 500, which may be used to implement a peak consumption classification system (e.g., classification system 116), as discussed above with respect to FIG. 1. In this example, computing device 500 includes processor 502 for executing instructions stored in memory device or element 404. The instructions can cause computing device 500 to execute a computer-implemented method, for example, to calculate a peak consumption threshold and to implement a predictive model to determine the likelihood of future peak events based on received weather data.

As would be apparent to one of skill in the art, computing device 500 can include various types of memory, data storage, and/or non-transitory computer-readable storage media (e.g., non-transitory memory 504), such as a first data storage for program instructions for execution by the processor 502, a separate storage for usage history or user information, a removable memory for sharing information with other devices, etc. Computing device 500 can also include one or more communication components 506, such as a Wi-Fi, Bluetooth®, radio frequency, near-field communication, wired, and/or wireless communication systems, etc. In embodiments where the computing device 500 is a specific-purpose device located at an electrical substation or other utility location, the communication components 506 may include utility network (e.g., substation) interface hardware.

Computing device 500 can communicate with a network (e.g., network 112), such as the Internet, and can be configured to communicate with other such devices, such as one or more smart thermostat device, demand response devices, and/or AMI metering devices (e.g., AMI 117). Computing device 500 can also include at least one input device 508 configured to receive input from a user. Such inputs may include, for example, one or more push button/s, touch pad/s, touch screen/s, wheel/s, joystick/s, keyboard/s, a mouse, keypad/s, or other such devices or elements enabling a user to input a command to the device. In some aspects, however, such a device may not include any buttons at all, but rather controlled through a combination of visual and audio commands, such that a user can manipulate data input to the device without direct physical contact. Computing device 500 can also include a display element 410, such as a touch-screen or liquid crystal display (LCD).

The various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business map servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

Although various embodiments described herein relate to electric power, the various methods, devices, systems, and technologies may also apply to other resources including, but not limited to, water, natural gas, internet bandwidth, etc.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

The description of the subject technology is provided to enable any person skilled in the art to practice the various embodiments described herein. While the subject technology has been particularly described with reference to the various figures and embodiments, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these embodiments will be readily apparent to those skilled in the art, and generic principles defined herein may be applied to other embodiments. Thus, many changes and modifications may be made to the subject technology, by one having ordinary skill in the art, without departing from the scope of the subject technology.

Any reference to elements in the singular are not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. All structural and functional equivalents to the elements of the various embodiments described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

It is understood that any specific order or hierarchy of steps in the processes disclosed is an illustration of exemplary approaches. Based upon design preferences, it is understood that the specific order or hierarchy of steps in the processes may be rearranged, or that only a portion of the illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more."

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

What is claimed is:

1. A computer-implemented method, executable by a processor, the method comprising:

receiving, by the processor, resource consumption data from one or more smart devices for a plurality of utility customers, wherein the resource consumption data comprises an indication of an amount of at least one consumable resource used by each of the plurality of utility customers;

segmenting, by the processor, the resource consumption data into one or more consumption categories based at least in part on similarity of resource consumption, wherein each of the one or more consumption categories are defined to include at least consumption data for similar days;

calculating, by the processor, a plurality of consumption values for each of the consumption categories;

identifying, by the processor, a peak consumption threshold for a selected consumption category, wherein the peak consumption threshold is based at least in part on a multiple of an average of the plurality of consumption values for the selected consumption category;

receiving, by the processor, weather forecast information for a future time period;

associating, by the processor, the weather forecast information with the selected consumption category;

determining, by the processor, a likelihood of a peak event for the selected consumption category, wherein the peak event includes exceeding the peak consumption threshold during the future time period based on the weather forecast information; and if the likelihood of the peak event exceeds a boundary threshold indicating that the likelihood is high, triggering, by the processor, resource conservation for a portion of the utility customers associated with the selected consumption category, wherein the resource conservation includes sending instructions to reduce consumption of the consumable resource during the future time period, wherein the triggering resource conservation causes at least one of the one or more smart devices to adjust consumption of the at least one consumable resource during the future time period.

2. The computer-implemented method of claim 1, further comprising:

building, by the processor, a model for each of the consumption categories, wherein the model for a respective consumption category is based on weather data associated with the respective consumption category.

3. The computer-implemented method of claim 2, wherein building the model comprises applying a linear regression model based on the resource consumption data and the peak consumption threshold for the respective consumption category.

4. The computer-implemented method of claim 1, wherein segmenting the resource consumption data further comprises:
identifying two or more similar time periods; and
associating the resource consumption data for each of the two or more similar time periods into a common consumption category from among the consumption categories.

5. The computer-implemented method of claim 1, wherein a subset of resource consumption data associated with a particular consumption category of the consumption categories comprises energy consumption data collected for a plurality of similar days corresponding with the particular consumption category.

6. The computer-implemented method of claim 1, wherein the peak consumption threshold is defined based on a predetermined percentile of the consumption values for the selected consumption category.

7. The computer-implemented method of claim 1, wherein triggering resource conservation of the at least one consumable resource for the portion of the plurality of utility customers comprises:
issuing a notification to each utility customer of the portion of the plurality of utility customers.

8. The computer-implemented method of claim 7, wherein the notification is individualized for each utility customer of the portion of the plurality of utility customers.

9. A device, comprising:
a processor connected to at least a memory and configured to execute instructions from the memory; and
the memory configured to store instructions that when executed by the processor cause the processor to:
receive resource consumption data from one or more smart devices for a plurality of utility customers, wherein the resource consumption data comprises an indication of an amount of at least one consumable resource used by each of the plurality of utility customers;
segment the resource consumption data into one or more consumption categories based at least in part on similarity of resource consumption, wherein each of the one or more consumption categories are defined to include at least consumption data for similar days;
calculate a plurality of consumption values for each of the one or more consumption categories;
identify a peak consumption threshold for a selected consumption category, wherein the peak consumption threshold is based at least in part on a multiple of an average of the plurality of consumption values for the selected consumption category;
receive weather forecast information for a future time period;
associate the weather forecast information with the selected consumption category;
determine a likelihood of a peak event for the selected consumption category, wherein the peak event includes exceeding the peak consumption threshold during the future time period based on the weather forecast information; and if the likelihood of the peak event exceeds a boundary threshold indicating that the likelihood is high, trigger resource conservation for a portion of the utility customers associated with the selected consumption category, wherein the resource conservation includes sending instructions to reduce consumption of the consumable resource during the future time period, wherein the triggering resource conservation causes at least one of the one or more smart devices to adjust consumption of the at least one consumable resource during the future time period.

10. The device of claim 9, wherein the instructions further comprise instructions that when executed by the processor cause the processor to:
build a model for each of the consumption categories, wherein the model for a respective consumption category is based on weather data associated with the respective consumption category.

11. The device of claim 10, wherein the model comprises a linear regression model based on the resource consumption data and the peak consumption threshold for the respective consumption category.

12. The device of claim 9, wherein the instructions to segment the resource consumption data into one or more consumption categories further comprise instructions that when executed by the processor cause the processor to:
identify two or more similar time periods; and
associate the resource consumption data for each of the two or more similar time periods into a common consumption category from among the consumption categories.

13. The device of claim 9, wherein the peak consumption threshold is based on a predetermined percentile of the consumption values for the selected consumption category.

14. The device of claim 9, wherein the instructions to trigger resource conservation of the at least one consumable resource for the portion of the plurality of utility customers further comprise instructions that when executed by the processor cause the processor to:
issue a notification to each utility customer of the portion of the plurality of utility customers.

15. A non-transitory, computer-readable medium having software encoded thereon, wherein the software, when executed by a processor, causes the processor to:
receive resource consumption data from one or more smart devices for a plurality of utility customers, wherein the resource consumption data comprises an indication of an amount of at least one consumable resource used by each of the plurality of utility customers;
segment the resource consumption data into one or more consumption categories based at least in part on similarity of resource consumption, wherein each of the one or more consumption categories are defined to include at least consumption data for similar days;
calculate a plurality of consumption values for each of the consumption categories;
identify a peak consumption threshold for a selected consumption category, wherein the peak consumption threshold is based at least in part on a multiple of an average of the plurality of consumption values for the selected consumption category;
receive weather forecast information for a future time period;
associate the weather forecast information with the selected consumption category;

determine a likelihood of a peak event for the selected consumption category, wherein the peak event includes exceeding the peak consumption threshold during the future time period based on the weather forecast information; and if the likelihood of the peak event exceeds a boundary threshold indicating that the likelihood is high, trigger resource conservation for a portion of the utility customers associated with the selected consumption category, wherein the resource conservation includes sending instructions to reduce consumption of the consumable resource during the future time period, wherein the triggering resource conservation causes at least one of the one or more smart devices to adjust consumption of the at least one consumable resource during the future time period.

16. The non-transitory, computer-readable medium of claim 15, wherein the software causes the processor to segment the resource consumption data into one or more consumption categories by:

identifying two or more similar time periods; and associating the resource consumption data for each of the two or more similar time periods into a common consumption category from among the consumption categories.

17. The non-transitory, computer-readable medium of claim 15, wherein the peak consumption threshold is based on a predetermined percentile of the consumption values for the selected consumption category.

18. The non-transitory, computer-readable medium of claim 15, wherein the software causes the processor to trigger resource conservation of the at least one consumable resource for the portion of the plurality of utility customers by:

issuing a notification to each utility customer of the portion of the plurality of utility customers.

* * * * *